2,912,416

AMIDE CONTAINING COPOLYMERS AND THEIR PREPARATION

Herbert Alfred Newey, Lafayette, Calif., assignor to Shell Development Company, New York, N.Y., a corporation of Delaware No Drawing. Application July 12, 1954
Serial No. 442,931

17 Claims. (Cl. 260—80.5)

This invention relates to new polymeric products. More particularly, the invention relates to a new class of amide-containing copolymers which are particularly useful as additives for fuel oils, and to a method for preparing the same.

Specifically, the invention provides new and particularly useful copolymers comprising copolymers of (1) an ethylenically unsaturated monomer having a single ethylenic group which is in a terminal position and has an uninterrupted chain of at least 10 carbon atoms, (2) an ester of an ethylenically unsaturated carboxylic acid and a lower alkanol, and (3) an N-substituted amide wherein the substituent on the nitrogen atom contains a polar group, said copolymer having an average of 4 to 1.1 total ester and amide groups per unit derived from the monomer containing an uninterrupted chain of at least 10 carbon atoms and at least 10% of the total ester and amide groups being amide groups. These special copolymers are preferably prepared by copolymerizing the ethylenically unsaturated monomer having a single ethylenic group in a terminal position and having an uninterrupted chain of at least 10 carbon atoms with the unsaturated ester in such proportions as to form a copolymer having an average of 4 to 1.1 ester groups per unit derived from the unsaturated monomer containing the uninterrupted chain of 10 carbon atoms, and then reacting this copolymer with a polypolar compound substituted with an

group and at least one additional polar group so that at least 10% of the ester groups of the copolymer are converted to amide groups through reaction with the polypolar compound.

It is an object of the invention to provide a new class of polymeric products. It is a further object to provide new 3-component copolymers and a method for their preparation. It is a further object to provide new amide-containing copolymers which are particularly useful and valuable as fuel oil additives. It is a further object to provide new copolymers which are outstanding stabilizing agents and anti-clogging agents for fuel oils. It is a further object to provide new copolymers which are useful as detergents and anti-wear agents for lubricating oils. These and other objects of the invention will be apparent from the following detailed description thereof.

It has now been discovered that these and other objects may be accomplished by the novel polymeric products of the invention which comprise copolymers of (1) an ethylenically unsaturated monomer having a single ethylenic group which is in a terminal position and has an uninterrupted chain of at least 10 carbon atoms, (2) an ester of an ethylenically unsaturated carboxylic acid and a lower alkanol, and (3) an N-substituted amide wherein the substituent on the nitrogen atom contains a polar group, said copolymer having an average of 4 to 1.1 total ester and amide groups per unit derived from the monomer containing an uninterrupted chain of at least 10 carbon atoms and at least 10% of the total ester and amide groups being amide groups. These special copolymers are preferably prepared by copolymerizing the ethylenically unsaturated monomer having a single ethylenic group in a terminal position and having an uninterrupted chain of at least 10 carbon atoms with the unsaturated ester in such proportions as to form a copolymer having an average of 4 to 1.1 ester groups per unit derived from the unsaturated monomer containing the uninterrupted chain of 10 carbon atoms, and then reacting this copolymer with a polypolar compound substituted with an

group and at least one additional polar group so that at least 10% of the ester groups of the copolymer are converted to amide groups through reaction with the polypolar compound. It has been found that the polymeric products having the above-described special structural features are particularly outstanding additives for fuel oils. When these particular products are added to the fuel oil, even in very small amounts, they display unexpected ability to inhibit the formation of sludge and sediment during prolonged storage periods, and prevent discoloration of the fuel oil. In addition, these polymeric products are retained in the fuel oil and not lost or leached therefrom when the oil is brought in contact with water, as is the case with many of the commercial fuel oil additives. The above-described amide-containing copolymers have also been found to be valuable as anti-wear agents and detergents for various lubricating oils and compositions.

The copolymers of the invention contain 3 essential units in certain proportions. One unit is derived from an ethylenically unsaturated monomer having a single ethylenic group which is in a terminal position and has an uninterrupted chain of at least 10 carbon atoms. The chain may be branched or unbranched and may contain cyclic structures but there should be a series of at least 10 carbon atoms joined together through a primary chemical bond. These monomers include, among others, unsaturated hydrocarbons, unsaturated esters, ethers, ketones and the like. Examples of such monomers include, among others, decene-1, dodecene-1, tridecene-1, tetradecene-1, pentadecene-1, hexadecene-1, heptadecene-1, octadecene-1, nonadecene-1, eicosene-1, heneicosene-1, docosene-1, tricosene-1, tetracosene-1, pentacosene-1, hexacosene-1, heptacosene-1, octacosene-1, nonacosene-1, triacontene-1, hetriacontene-1, dotriacontene-1, tritriacontene-1, tetratriacontene-1, pentatriacontene-1, hexatriacontene-1, heptatriacontene-1, octatriacontene-1, nonatriacontene-1, tetracontene-1, pentacontene-1, hexacontene-1, and heptacontene-1, vinyl hendecanoate, vinyl laurate, vinyl tridecanoate, vinyl myristate, vinyl pentadecanoate, vinyl palmitate, vinyl margarate, vinyl stearate, vinyl nonadecanoate, vinyl arachidate, vinyl behemate, vinyl 4,5,6-trimethyldodecanoate, vinyl 6,8,9-triethyl tridecanoate, allyl stearate, vinyl hydroxystearate, vinyl chlorostearate, vinyl cyanostearate, vinyl acetylstearate, vinyl dodecyl ether, vinyl tridecyl ether, vinyl tetracosyl ether, vinyl hexacosyl ether, allyl dodecyl ether, vinyl dodecyl ketone, vinyl tridecyl ketone, vinyl nonadecyl ether, vinyl octadecyl ether, vinyl octadecyl ketone, vinyl chlorododecyl ether, and the like.

Particularly preferred ethylenically unsaturated monomers to be used in preparing the copolymers are those having an uninterrupted chain of from 10 to 30 carbon atoms, and more preferably an alpha-olefin (normal or branched) containing from 16 to 30 carbon atoms, such as, for example, n-hexadecene-1, n-octadecene-1, n-tricosene-1, n-octacosene-1, and the like. These preferred olefinic materials can be obtained for example, by cracking paraffin waxes, as is well known in the art.

The second unit contained in the novel copolymer is derived from an ester of an ethylenically unsaturated carboxylic acid and a lower alkanol. The acids used in preparing these esters may be monocarboxylic acid or polycarboxylic acid and may have the ethylenic group in a terminal or internal position. The alcohols used in the esterification of these acids comprise the lower alkanols, and preferably those containing no more than 4 carbon atoms, such as methanol, ethanol, n-propanol and isopropanol. If the acids are polycarboxylic acids, only one of the carboxyl groups may be esterified with the lower alkanols and the others may be esterified with other types of alcohols, or, if desired all of the carboxyl groups may be esterified with the lower alkanols. Examples of these esters include, among others, methyl acrylate, ethyl acrylate, methyl chloroacrylate, methyl alpha-isopropylacrylate, ethyl alpha-amylacrylate, isopropyl alpha-cyclohexylacrylate, propyl alpha-hexylacrylate, ethyl methacrylate, propyl methacrylate, methyl alpha-acetylacrylate, methyl alpha-cyclohexylacrylate, dimethyl maleate, diethyl maleate, dipropyl maleate, dimethyl chloromaleate, dimethyl hexylmaleate, methyl octyl maleate, methyl octadecyl maleate, ethyl cyclohexyl chloromaleate, dimethyl itaconate, diethyl glutaconate, methyl octyl aconitate, dimethyl glutaconate, methyl hexyl glutaconate, dimethyl 2-pentenedioate, diethyl 3-octenedioate-1,7, methyl cyclohexyl glutaconate, ethyl phenyl aconitate, and the like.

Particularly preferred esters to be employed are the esters of the ethylenically unsaturated aliphatic mono- and dicarboxylic acids containing no more than 12 carbon atoms, and alkanols containing no more than 3 carbon atoms, and more preferably the alkyl esters of the alkenoic acids containing no more than 10 carbon atoms. Coming under special consideration are the lower alkyl esters of acrylic and the alpha-alkyl substituted acrylic acids, such as methyl acrylate, propyl acrylate, propyl methacrylate, methyl alpha-butylacrylate, and the like.

The third unit contained in the novel copolymer is derived from N-substituted amides of unsaturated carboxylic acids wherein the substituent on the nitrogen atom contains a polar group. The unsaturated carboxylic acids used in preparing such amides are the same as those described above for the unsaturated ester, i.e. they may be mono-carboxylic or polycarboxylic acid and may have the ethylenic group in a terminal or internal position. If the acid is a polycarboxylic acid, it may be a polyamide or it may have the other carboxyl group or groups esterified with any of the above-described lower alcohols or higher alcohols, such as, for example, octyl alcohol, decyl alcohol, dodecyl alcohol, octadecyl alcohol, and the like. The polar groups attached to the nitrogen atom of the amide group are functional radicals which contain a non-metallic negative atom from groups V to VI of the periodic table, such as N, P, O and S. Such polar groups include, among others, —XR, —CXXH, —CN, —SCN, —NH$_2$ and —CONH$_2$, wherein X is O or S and R is a hydrogen or hydrocarbon radical. Examples of the N-substituted amides are N-butanol methacrylamide, N-hexanol methacrylamide, N-(3-aminopropyl)methacrylamide, N-(5-carboxylhexyl)-acrylamide, N-morpholinoethyl acrylamide, N-dimethylaminoethyl acrylamide, N-(6-mercaptooctyl)acrylamide, N-(6,6-dihydroxyethyl octyl)acrylamide, N-(6-cyanohexyl)acrylamide, N-(6-hydroxyoctyl)alpha-octylacrylamide, N,N-di(6-hydroxyoctyl)maleamide, N,N-di(dimethylaminoethyl)itaconamide, N,N-di(mercaptobutyl)-aconitamide, N-(6-thiocyanooctyl)acrylamide, and N-(4-hydroxyhexyl)butyl aconitamide.

Preferred unsaturated amides of this type comprise the N-substituted amides of the ethylenically unsaturated aliphatic mono- and dicarboxylic acids containing no more than 12 carbon atoms wherein the substituent attached to the nitrogen atom is substituted with a —NR$_2$, —OH, —COOH, $$\begin{array}{c} H \\ | \\ -C=O \end{array}$$

—CNR$_2$, —CN, —SCN and —SH group (wherein R is a hydrogen and/or hydrocarbon radical). Especially preferred are the aforedescribed unsaturated amides wherein the nitrogen atom is attached to an aliphatic or aromatic hydrocarbon radical which is in turn substituted with at least one member of the group of —NH$_2$, —NHR, —NR$_2$, —OH, —COOH

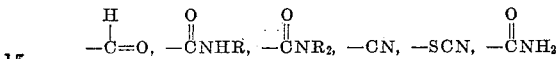

and —SH groups (wherein R is an aliphatic or aromatic hydrocarbon radical) said unsaturated amide preferably containing no more than a total of 25 carbon atoms.

Coming under special consideration are the N-(hydroxyhydrocarbyl)amides, N-(aminohydrocarbyl)amides, N-(mercaptohydrocarbyl)amides, N-(formylhydrocarbyl)amides, N-(thiocyanohydrocarbyl)amides, and N-(cyanohydrocarbyl)amides of ethylenically unsaturated monocarboxylic acids, and particularly those in which the hydrocarbyl radicals contain no more than 15 carbons and preferably no more than 12 carbon atoms.

The foregoing copolymers may be prepared by any suitable method. They are preferably prepared, however, by first copolymerizing the ethylenically unsaturated monomer having an uninterrupted chain of at least 10 carbon atoms with the unsaturated ester in the necessary proportions so as to have the units of the unsaturated monomer having the uninterrupted chain of at least 10 carbon atoms and the ester groups in the required ratio, and then treating this copolymer with a polypolar compound having a $$\begin{array}{c} H \\ | \\ -N- \end{array}$$

group and an additional polar group so as to convert at least 10% of the ester groups to amide groups.

In this method, it is essential first to prepare the copolymer of the unsaturated monomer having an uninterrupted chain of at least 10 carbon atoms and the unsaturated esters so as to obtain the necessary ratio between the unit of the unsaturated monomer and the ester groups. Products having such a ratio of units are obtained by controlling the ratio of concentrations of monomers used in the polymerization reaction. The above two groups of monomers fail to have the same polymerization rate so that the proportions in which they enter the copolymer molecule will differ from the proportions in which they occur in the reaction mixture. It will be necessary, therefore, to determine beforehand the ratio of concentrations of monomers needed to give copolymers having the two monomers in the above-described ratio. This can be easily determined by conducting a few routine runs and examining the compostion of the resulting copolymer. The initial concentration of monomer can then be adjusted so as to give the copolymer of the desired composition.

As the reaction progresses, the monomer concentration ratios change due to the difference in the rate of polymerization and, in some cases, the ratio will change so that it will not be producing copolymers having the monomers in the desired ratio. While this is not too damaging if a very small part of the copolymer has the monomers outside of the desired ratio, but if there is a considerable amount of copolymer formed outside of the ratio, the products will fail to have the desired superior properties. The best products are, therefore, obtained by employing some steps during the copolymerization which will insure that the ratio of concentrations of monomers does not vary during the reaction period from the above-described limits. This may be accomplished in a variety of ways. One way, for example, comprises stopping the copolymerization after the ratio of the monomer concentrations has reached the limiting value. This method is of particular value if the change in the ratio between the monomer concentrations during the copolymerization is slow and a considerable yield of copolymer has been obtained before the limiting values have been attained.

Another method is to adjust the ratio between the monomer concentrations by adding monomer during the course of the polymerization. In a copolymerization of the above-described two groups of monomers, it is sometimes sufficient if the monomer which is consumed at the fastest rate is added to the reaction mixture. This addition can occur periodically or continuously.

To obtain copolymers wherein the greatest part of their macromolecules have the same composition and thus display their superior properties to the highest extent, it is preferred to keep the concentrations of the monomers constant as well as the ratio of concentrations constant. This is preferably obtained by adding all of the monomers at the rate at which they are consumed. This greatest uniformity of conditions is generally obtained in a continuous process whereby copolymerization takes place in a space from which the copolymer is drained off at the rate at which it is formed and in which the feed of monomers and other substances employed in the copolymerization exactly compensate for the consumption and drainage taking place when the copolymer is removed.

Copolymers used in preparing the superior amidized products have molecular weights below about 150,000 and preferably between 10,000 and 40,000. The molecular weights reported herein are determined by light scattering technique described in Chem. Rev., volume 40, page 319 (1948).

Any suitable conditions may be employed to maintain the molecular weight within the desired range. Factors which exert an influence on the molecular weight of the copolymer include the method of polymerization, (e.g. polymerization in emulsion, suspension solvent solution or bulk), the nature and concentration of the catalyst employed, the temperature, presence of chain transfer agents, etc. When the polymerization is accomplished in solution, the molecular weight of the product will be lower when the dilution is stronger, i.e., when the concentration of solvent is greater. In general, the higher the polymerization temperature the lower will be the molecular weight of the finished copolymer.

Materials that may be used as chain transfer agents in the preparation of the copolymers include alcohols, aldehydes, such as valeraldehyde, ketones, such as acetone, methyl ethyl ketone, ethers, such as diethyl ether, halogenated hydrocarbons, as carbon tetrachloride, halogenated alcohols, aldehydes, ethers, organic acids, such as alpha-bromopropionic acid and esters or anhydrides of such acids, such as propyl trichloroacetate, acid halides, such as acetyl chloride, esters of inorganic acids, such as tetraethyl silicate, tributyl phosphate, various nitrogen compounds, such as amines, cyanogen and nitro compounds, sulfur halides, benzene sulphonyl chloride, mercaptans, such as dodecyl mercaptan, and the related organic sulfur compounds. The amount of such agent employed will vary over a wide range but in most cases will be between 1% to 30% by weight of the material being polymerized.

The copolymers may be prepared in bulk, solvent solution, or in an aqueous emulsion or suspension system. Best results are obtained by heating the monomers in bulk or solvent solution and these are the preferred methods to be employed.

Catalysts used in the preparation of the copolymers are preferably the peroxide catalyst, such as, for example, benzoyl peroxide, lauroyl peroxide, tertiary butyl hydroperoxide, 2,2-bis-(tertiary butyl peroxy-butane, di-(tertiary butyl)peroxide, tertiary butyl perlargonate, hydrogen peroxide, sodium or potassium persulfate, percarbonate, peracetic acid, and the like. The amount of the catalyst added may vary over a considerable range. In general, the amount of the catalyst added will vary from 0.1% to 5% by weight of the material being polymerized. Preferred amounts vary from 1% to 2% by weight.

The catalyst selected and the temperature employed in the copolymerization will be varied so as to produce products having the desired molecular weights. Thus, if one desires very low molecular weight products, one should select a higher reaction temperature, such as of the order of 150° C. to 300° C., and select a catalyst that has a satisfactory decomposition rate within that range of temperature. If the higher molecular weight products are desired, one may select the lower range of temperature, such as 50° C. to 100° C., and select a catalyst having a decomposition rate within that range. In general, it is preferred to employ temperatures within the range of 80° C. to 200° C. and catalysts that will be effective within that range.

The polymerization may be conducted in the presence or absence of air. In most cases, however, it has been found desirable to conduct the polymerization in the absence of air, e.g., in the presence of an inert gas such as nitrogen. Atmospheric, reduced or superatmospheric pressures may be employed.

At the end of the polymerization, the unreacted monomer is removed by any suitable means, such as distillation, and the like. It is also desirable to remove, preferably by distillation, polymeric fractions of very low molecular weight, such as that boiling below 190° C. at 1 mm.

Amide-containing copolymers of the present invention are obtained by reacting the above-described copolymers with a polypolar compound containing a

group and at least one additional polar group. The polar groups are those described above in the description of the unsaturated amides, i.e. radicals which contain a non-metallic negative atom from groups V and VI of the periodic table, such as N, P, O and S. Such polar groups include, among others, —XR, —CXXH, —CN, —SCN, —NR$_2$ and —CONR$_2$, wherein X is O and S and R is a hydrogen or a hydrocarbon radical. Examples of these polypolar compounds include, among others, diethylene triamine, triethylene tetramine, N,N-dimethyl-aminoproplyleneamine, N,N-dibutyl-1,3-propane diamine, N,N-diethyl-1,3-propane diamine, 1,2-diamino-2-methyl-propane, 2,3-diamino-2-methylbutane, 2,4-diamino-2-methylpentane, 2,7-diamino-2,6-dimethyloctane, diamino-pyridine, meta-phenylene diamine, beta-propylaminoethanol, beta-isopropylamino ethanol, beta-cyclohexyl-aminoethanol, aminocyclohexanol, gamma-ethylamino-propanol, delta-isobutylaminobutanol, beta-laurylaminoethanol, N-ethyl 3-aminopentanamide, N-(aminoethyl)-morpholine, 3,5-diaminobenzamide, N-isopropyl 4-amino-dodecanamide, N-butyl 4-aminohexadecanamide, 3-aminopentanoic acid, 4-aminohexanoic acid, 4,6-diamino-decanoic acid, 4-aminocyclohexanoic acid, aminosuccinonitrile, aminoisophthalonitrile, aminomyristonitrile, aminooleonitrile, aminobenzonitrile, 3-aminothiobenzoic acid, 4-aminocyclohexanecarboxylic acid, 3-amino-5-thiocyanooctane, 4-amino-6-thiocyanododecane, 3-aminothionoheptanoic acid, 4-aminothionooctanoic acid, 4-aminopentanamide, 5-aminoheptanamide, and the like.

Particularly preferred polypolar compounds to be used in preparing the amide-containing polymeric products of the present invention include the primary amines substituted with a —NR$_2$, —OH, —CN, —COOH,

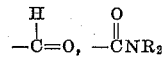

—SCN, or —SH group (wherein R is hydrogen and/or a hydrocarbon radical), such as triethylene diamine, N,N - dimethylaminopropyleneamine, N,N - dibutyl-1,3-propane diamine, N,N-diethyl-1,3-propane diamine, 1,2-diamino-2-methylpropane, 2,4-diamino-2-methylpentane, diaminopyridine, beta-cyclohexylamino-ethanol, aminocyclohexanol, N-isopropylhexadecanamide, 4-amino-6-thiocyanododecane, and the like.

Especially preferred are the aliphatic and aromatic hydro carbons substituted with a primary —$NH_2$ group and at least one member of the group consisting of a —$NH_2$, —NHR, $NR_2$, —OH, —COOH,

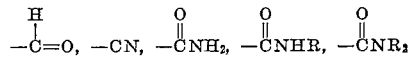

—SCN and —SH group (wherein R is an aliphatic or aromatic hydrocarbon radical) and containing no more than 20 carbon atoms. Coming under special consideration are the alkyl, cycloalkyl, alkenyl, cycloalkenyl, aryl, alkaryl and arylalkyl amines substituted with a member of the group of —$NH_2$, —NHR, —$NR_2$, —OH,

—CN and —SH groups (wherein R is an alkyl, cycloalkyl, aryl, alkaryl, or arylalkyl radical containing no more than 10 carbon atoms), and containing in the total molecule no more than 16 carbon atoms.

The amount of the polypolar compound to be reacted with the copolymer should be sufficient to convert at least 10% of the ester groups to amide groups, i.e. convert at least 10% of the

radicals attached to the copolymer chain (wherein R is a lower alkyl radical) to

groups. Preferably from 30% to 95% of the ester groups are converted to amide groups. The amount required for this purpose can be easily calculated from the analytical data of the copolymers such as their ester values. In most cases, it is preferred to employ from 10% to 30% excess of that theoretically required to convert the desired number of ester groups.

The reaction between the copolymer and the amine may be accomplished by merely mixing the two components together, alone, or in a mutual solvent and, if necessary, applying heat. Preferred temperatures range from about 50° C. to 250° C. and preferably from 100° C. to 165° C. If the amine has a plurality of polar groups which may cross-link the copolymers, such as a plurality of amino groups, it will be necessary to employ an excess of the amine or milder reaction conditions as lower temperatures, such as temperatures below about 200° C. and shorter reaction periods, in order to prevent such cross-linking.

The alcohol formed during the reaction between the copolymer and the polypolar compound may be removed from the reaction mixture as desired. In most cases, it is preferred to remove the alcohol substantially as fast as it is formed in the reaction.

At the end of the reaction, the unreacted polypolar compound, solvent and remaining alcohol may be removed by any suitable method, such as by distillation, extraction, fractional precipitation, and the like.

The amide-containing copolymers of the invention as prepared above are viscous liquids to solids. As indicated above, they have a molecular weight varying up to about 150,000 and have a plurality of long side chains containing at least 10 carbon atoms, and a plurality of side chains bearing polar groups.

These amide-containing copolymers have been found to have a high degree of oil solubility and can be combined in a variety of proportions with various oils, solvents and resins. As indicated above, they are particularly superior as additives for fuel oils as they are readily compatible therewith and when added even in small amounts act to inhibit formation of sludge and sediment during prolonged storage of the oils. In addition, these polymeric products act to prevent discoloration of the oils during the storage period. Furthermore, the polymeric products are not easily leached or removed from the oils when exposed to water so that they are able to exert their anti-clogging and color stabilization properties over a longer period than many of the additives now used commercially. The fuel oils in which the copolymers are particularly effective are the hydrocarbon distillate fuel oils such as treated or untreated cracked fuel oils, or mixtures of cracked fuels (thermally cracked and/or catalytically cracked) with straight run fuel oils, having components normally distilling at about 500° F. and having an end distillation point not exceeding 750° F. Generally such fuels have a boiling range of from 340° F. to about 700° F. and preferably have a boiling range of from about 400° F. to about 675° F. The copolymers are employed with these oils in amounts varying from 0.01% to about 2%, and more preferably in amounts varying from 0.1% to 1% by weight.

The amide-containing copolymers of the present invention also find use as detergents and anti-wear agents for lubricating oils and lubricating compositions. The products may be further reacted through the polar groups to form a great variety of new polymer products, many of which are of the "graft" copolymer type.

To illustrate the manner in which the invention may be carried out, the following examples are given. It is to be understood, however, that the examples are for the purpose of illustration and the invention is not to be regarded as limited to any of the specific materials recited therein. Unless otherwise specified, parts disclosed in the examples are parts by weight.

*Example 1*

This example illustrates the preparation of an amide-containing copolymer from (1) a copolymer of octadecene-1 and methyl acrylate and (2) N,N-dimethylaminopropyleneamine, and the unexpected properties of this product as a fuel oil additive and anti-wear agent.

504 parts (2 mols) of octadecene-1 and 43 parts (.5 mol) of methyl acrylate were mixed with 2.7 parts of 2,2-bis(tert-butylperoxy)-butane in a stainless steel bomb and heated for 16 hours at 110° C. The unreacted monomer was then removed by distillation under vacuum. There was a 23.6% conversion to polymer. The resulting product was a water-white liquid polymer containing 1.3 units of methyl acrylate per unit of octadecene-1.

100 parts of the above-copolymer was mixed with 60 parts of N,N-dimethylaminopropyleneamine and the mixture heated at 100° C. for 4 hours. The alcohol formed in the reaction was removed by distillation under reduced pressure. The resulting product was a light brown polymer having mol weight of 24,000. Analysis indicated that 32.8% of the ester groups had been converted to amide groups, giving a product with a ratio of methoxycarbonyl to dimethylaminopropylcarbamyl of about 2 to 1 and a ratio of total of ester and amide groups to hexadecyl radicals of 1.3 to 1.

The outstanding property of the above amide-containing copolymer as a fuel oil additive is shown by the following. 0.01% by weight of the amidized copolymer was added to an unstabilized No. 3 fuel oil. The resulting composition had good color stability and on storage failed to deposit any sludge or sediment. The composition also had excellent resistance to leaching when exposed to steam. Some of these properties are shown in the following table in comparison to those obtained from a fuel oil containing no additive and fuel oil containing two commercial additives.

| Additive | Color Stability, NPA Color After 48 Hrs at 212° F. | Screen Clogging Test, P mm. H₂ [b] | Leaching Resistance, Steamings to Fail [c] | Haze Stability, Hours to Clear at Room Temp. |
|---|---|---|---|---|
| None | 8+(sediment) | 382 | 1 | 72 |
| Commercial Additive [a] (1) | 7+ | 141 | 7 | 96+ |
| Commercial Additive [a] (2) | 5+ | 7 | 3 | |
| Amidized Copolymer Prepared Above | 2 | 3 | 16 | 96+ |

[a] (1) Mixture sodium sulfonate and calcium salt of phenolformaldehyde condensate. (2) 0.02% W du Pont No. 2 Fuel oil additive.
[b] Approximately one gallon of the test fuel is filtered through a 200 mesh screen and thereafter steamed and circulated through a 100 mesh Monel screen ⅝" in diameter at the rate of 36 ml./min. for a period of 16 hours at room temperature. The extent of screen clogging is measured by the pressure drop across the screen. A constant flow rate is maintained by metering pumps and the pressure drop (P) across the screen is measured by means of an open end monometer.
[c] 14 parts steam per 3500 ml. of test fuel circulate through screen clogging machine for 5 hours. Let remain overnight in storage. Process repeated. After each run pressure drop measure. Failure is when pressure goes up.

The anti-wear and lacquer formation inhibiting characteristics of this amide of this Example I was demonstrated at 0.5% w. concentration on an SAE 30 refined mineral lube oil stock, by the FL-2 Engine Test described in the CRC Handbook. The wear was only 60% of the wear with the same oil, but without the additive while the lacquer rating was 9 out of a clean 10 as compared with a rating of only four the oil without the additive.

*Example II*

The preparation shown in Example I above was repeated with the exception that the catalyst was benzoyl peroxide and the polymerization was effected at a temperature of 80° C. (16 hours). The resulting product was a water-white liquid polymer containing 1.63 units derived from methyl acrylate per unit derived from octadecene-1.

100 parts of the above copolymer was mixed with 200 parts of N,N-dimethylaminopropyleneamine and the mixture heated at 110° C. for 32 hours. The alcohol formed in the reaction was removed by distillation under reduced pressure. The resulting product was a light brown solid. Analysis indicated that 65.6% of the ester groups had been converted to amide groups.

The amidized copolymer produced above was added in amount of 0.01% to No. 3 fuel oil. The resulting composition had good color stability and resistance to deposition of sludge and sediment. The composition also had excellent resistance to leaching when exposed to steam.

The above amide-containing copolymer also proved to be a promising detergent and anti-wearing agent for lubricating oils.

*Example III*

This example illustrates the preparation of an amidized product from (1) a copolymer of octadecene-1 and methyl acrylate and (2) N,N-diethylaminopropyleneamine and the use of this product as a fuel oil additive.

100 parts of a copolymer of octadecene-1 and methyl acrylate as produced in Example I was mixed with 130 parts of N,N-diethylaminopropyleneamine and the mixture maintained at 160-165° C. at 24 hours. The resulting product was a light brown solid. Analysis indicated that 81.5% of the ester groups had been converted to amide groups.

The amide-containing copolymer produced above was added in amount of 0.01% to No. 3 fuel oil. The resulting composition had good color stability and resistance to deposition of sludge and sediment. The composition also had good resistance to leaching when exposed to steam.

*Example IV*

This example illustrates the preparation of an amidized product from (1) a copolymer of octadecene-1 and methyl acrylate and (2) monoethanolamine, and the use of this product as a fuel oil additive.

100 parts of a copolymer of octadecene-1 and methyl acrylate as produced in Example I was mixed with 61 parts of monoethanolamine and the mixture maintained at 165° C. for 24 hours. The resulting product was a light brown solid. Analysis indicated that 51% of the ester groups had been converted to amide groups.

The amide-containing copolymer produced above was added in amount of 0.01% to No. 3 fuel oil. The resulting composition had good color stability and resistance to deposition of sludge and sediment. The composition also had good resistance to leaching when exposed to steam.

*Example V*

This example illustrates the preparation of an amidized product from (1) a copolymer of vinyl stearate and methyl acrylate and (2) N,N-dibutyl propane-1,3-diamine, and the use of this product as a fuel oil additive.

310 parts of vinyl stearate and 43 parts of methyl acrylate are mixed with 2.5 parts of 2,2-bis(tert-butylperoxy)butane in a stainless steel bomb and heated for 16 hours at 110° C. The unreacted monomer was then removed by distillation under vacuum. The resulting product has approximately 2 units derived from methyl acrylate per unit derived from vinyl stearate.

100 parts of the above copolymer is mixed with 60 parts of N,N-dibutyl propane-1,3-diamine and the mixture heated at 100° C. for 4 hours. The alcohol formed in the reaction is removed by distillation under reduced pressure. The resulting product is a light brown solid. Analysis indicated that approximately 40% of the ester groups had been converted to amide groups.

The amidized copolymer produced above is added in amount of 0.01% to No. 3 fuel oil. The resulting composition has good color stability and resistance to deposition of sludge and sediment. The composition also has good resistance to leaching.

An amide-containing copolymer having related properties is obtained by replacing the N,N-dibutyl propane-1,3-diamine in the above process with aminoethyl morpholine.

*Example VI*

This example illustrates the preparation of an amidized product from (1) a copolymer of hexadecene-1 and methyl methacrylate and (2) 4-aminobutylmercaptan and the use of this product as a fuel oil additive.

448 parts of n-hexadecene-1 and 43 parts of methyl methacrylate are mixed with 2.5 parts of 2,2-bis(tert-butylperoxy)butane in a stainless steel bomb and heated for 16 hours at 110° C. The unreacted monomer was then removed by distillation under vacuum. The resulting product has approximately 2 units of methyl methacrylate per unit of hexadecene-1.

100 parts of the copolymer prepared above is mixed with 100 parts of 4-aminobutylmercaptan and the mixture heated at 100° C. for 4 hours. The alcohol formed in the reaction is removed by distillation under reduced pressure. The resulting product is a light brown solid.

The amidized copolymer produced above when added to No. 3 fuel oils acts as an anti-clogging and stabilizing agent in the same manner as the amidized copolymers shown in the other examples.

Amidized copolymers having related properties are obtained by replacing the 4-aminobutylmercaptan in the above process with equivalent amounts of 1-cyano-5-aminopentane and 1-thiocyano-5-aminopentane.

*Example VII*

This example illustrates the preparation of an amidized polymeric product from (1) a copolymer of octadecene-1 and methyl acrylate and (2) 4-aminobutyraldehyde.

100 parts of a copolymer of octadecene-1 and methyl acrylate as produced in Example I is mixed with 100 parts of 4-aminobutyraldehyde and the mixture maintained at 160–165° C. for 24 hours. The resulting product is a light colored solid. Analysis indicated that over 25% of the ester groups had been converted to amide groups.

The above-amide-containing copolymer is a good stabilizing agent for fuel oil when added in amounts varying from 0.01% to .1%.

*Example VIII*

This example illustrates the preparation of an amidized polymeric product from (1) a copolymer of hexadecene-1 and methyl methacrylate and (2) 4-aminopentanamide.

100 parts of the copolymer of hexadecene-1 and methyl methacrylate produced in Example VI is mixed with 150 parts of 4-aminopentanamide and the mixture maintained at 150–165° C. for 20 hours. Analysis of the resulting polymer indicated that about 30% of the ester groups had been converted to amide groups.

The above-described amide-containing copolymer is a good stabilizing agent for fuel oil when added in amounts varying from 0.01% to .1%.

*Example IX*

An amidized copolymer having related properties as a fuel oil additive is obtained by reacting the octadecene-1-methyl acrylate copolymer of Example I with 4-aminopentanoic acid.

I claim as my invention:

1. An amide-containing polymeric product comprising a copolymer of (1) an alkene-1 containing from 10 to 30 carbon atoms, (2) an ester of an ethylenically unsaturated carboxylic acid and a alkanol containing no more than 4 carbon atoms, and (3) an N-substituted amide of an ethylenically unsaturated carboxylic acid, which acid is the same as that acid used in making the ester defined in (2) above, wherein the substituent on the nitrogen atoms contains a polar group selected from the group consisting of —NR$_2$, —OH, —COOH,

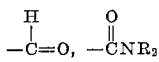

—SCN, —CN, and —SH wherein R is a member of the group consisting of hydrogen and hydrocarbon radicals, said copolymer having an average of 4 to 1.1 total ester and amide groups per unit of the alkene-1 containing from 10 to 30 carbon atoms and at least 10% of the total ester and amide groups being amide groups, and said copolymer containing only units of the monomers defined in (1), (2) and (3) above.

2. A product as defined in claim 1 wherein the unsaturated ester is an alkyl ester of an acrylic acid.

3. A thermoplastic unvulcanized oil-soluble amide-containing polymeric product comprising a copolymer of (1) an alkene-1 containing from 18 to 30 carbon atoms, (2) an ester of an ethylenically unsaturated carboxylic acid and a alkanol containing no more than 4 carbon atoms, and (3) an N-substituted amide of an ethylenically unsaturated carboxylic acid, which acid is the same as that acid used in making the ester defined in (2) above, wherein the substituent attached to the nitrogen atom contains an additional polar group of the group consisting of —NR$_2$, —OH, —COOH,

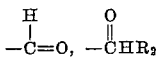

—SCN, —CN, and —SH wherein R is a member of the group consisting of hydrogen and hydrocarbon radicals, said copolymer having a molecular weight below 150,000, an average of 4 to 1.1 total ester and amide groups per unit derived from the alkene-1 containing from 10 to 30 carbon atoms, and at least 10% of the total ester and amide groups being amide groups, and said copolymer containing only units of the monomers defined in (1), (2) and (3) above.

4. A product as defined in claim 3 wherein the N-substituted amide is an amide of the formula

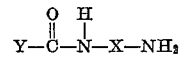

wherein X is a bivalent hydrocarbon radical and Y is a radical derived from an aliphatic unsaturated monocarboxylic acid by removing the carboxyl group.

5. A product as defined in claim 3 wherein the N-substituted amide is an amide of the formula

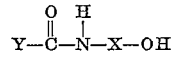

wherein X is a bivalent hydrocarbon radical and Y is a radical derived from an aliphatic unsaturated monocarboxylic acid by removing the carboxyl group.

6. A product as defined in claim 3 wherein the N-substituted amide is an amide of the formula

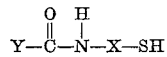

wherein X is a bivalent hydrocarbon radical and Y is a radical derived from an aliphatic unsaturated monocarboxylic acid by removing the carboxyl group.

7. The product as defined in claim 3 wherein the ester is methyl acrylate.

8. An amidized product as defined in claim 3 wherein the alkene-1 is 1-octadecene and the ester is methyl methacrylate.

9. A product as defined in claim 3 wherein the alkene-1 is 1-octadecene and the ester is methyl acrylate and the amide is N-(dimethylaminopropyl)acrylamide.

10. A product as defined in claim 3 wherein the unsaturated amide is N-(ethanol)acrylamide.

11. A product as defined in claim 3 wherein the unsaturated amide is N-(dimethylaminopropyl)acrylamide.

12. A process for preparing an amide-containing copolymer having improved properties as a fuel oil additive consisting of heating at a temperature between 50° C. and 250° C. (1) a copolymer of an alkene-1 containing from 10 to 30 carbon atoms, and an ester of an ethylenically unsaturated carboxylic acid and a alkanol containing no more than 4 carbon atoms, said copolymer having an average of from 4 to 1.1 ester groups per unit of the ethylenically unsaturated monomer having the uninterrupted chain of at least 10 carbon atoms, with (2) a polypolar compound containing a

group and at least one additional polar group selected from the group consisting of —NR$_2$, —OH, —COOH,

—CNR$_2$, —SCN, —CN, and —SH wherein R is a member of the group consisting of hydrogen and hydrocarbon radicals in sufficient quantity to convert at least 10% of the ester groups of the said copolymer to amide groups, the alcohol formed in the reaction being removed by distillation during the course of the reaction.

13. A process as in claim 12 wherein the heating and reacting is accomplished at a temperature of from 50° C. to 200° C. and for a period which is insufficient to cause gelation.

14. A process for preparing a thermoplastic unvulcanized oil-soluble amidized polymeric product which consists of heating at a temperature between 50° C. and 200° C. a copolymer of an alkene-1 containing from 10 to 30 carbon atoms and an ester of an ethylenically unsaturated carboxylic acid and a alkanol containing no more than 4 carbon atoms, said copolymer having a molecular weight of below 4000 and has an average of from 4 to 1.1 ester groups per mole of the alpha-olefin, with a primary amine substituted with an additional polar group selected from the group consisting of —NR$_2$, —OH, —COOH,

—CNR$_2$, —SCN, —CN, and —SH wherein R is a member of the group consisting of hydrogen and hydrocarbon radicals in sufficient quantity so as to convert from 35% to 90% of the ester groups of the copolymer into amide groups, the alcohol formed in the reaction being removed by distillation during the course of the reaction.

15. A process as in claim 14 wherein the alkene-1 is octadecene-1 and the ester is methyl acrylate.

16. A process as in claim 14 wherein the primary amine is N,N-dimethylaminopropyleneamine.

17. A process as in claim 14 wherein the primary amine is ethanolamine.

References Cited in the file of this patent

UNITED STATES PATENTS

| | | |
|---|---|---|
| 2,146,209 | Graves | Feb. 7, 1939 |
| 2,527,081 | Ross et al. | Oct. 24, 1950 |
| 2,615,845 | Lippincott et al. | Oct. 28, 1952 |
| 2,698,316 | Giammaria | Dec. 28, 1954 |
| 2,737,452 | Catlin et al. | Mar. 6, 1956 |
| 2,781,319 | Barnum et al. | Feb. 12, 1957 |
| 2,800,452 | Bondi et al. | July 23, 1957 |

OTHER REFERENCES

Biswell et al.: Industrial and Engr. Chemistry, vol. 47, No. 8, August 1955, pp. 1598–1601; (presented by National Meeting, American Chemical Society, Kansas City, Mo., March 23 to April 1, 1954). (Copy in the Patent Office Library.)